United States Patent [19]

Burens et al.

[11] 3,930,170

[45] Dec. 30, 1975

[54] SWITCHING TRANSISTOR DRIVE APPARATUS

[75] Inventors: James H. Burens, Westlake Village, Calif.; Kenneth A. Wallace, Columbus, Ohio

[73] Assignee: North Electric Company, Galion, Ohio

[22] Filed: June 4, 1974

[21] Appl. No.: 476,254

[52] U.S. Cl. .................. 307/254; 307/282; 307/296

[51] Int. Cl.[2] .......................................... H03K 17/60

[58] Field of Search ............ 307/254, 275, 282, 296

[56] References Cited

UNITED STATES PATENTS

| | | | |
|---|---|---|---|
| 3,610,963 | 10/1971 | Higgins | 307/282 X |
| 3,657,569 | 4/1972 | Froeschle | 307/275 |

*Primary Examiner*—Siegfried H. Grimm

*Attorney, Agent, or Firm*—George R. Douglas, Jr.; Anthony D. Cennamo

[57] ABSTRACT

Switching transistor drive apparatus having a first transistor for receiving a signal condition, a resistance, capacitor and transformer primary for charging the capacitor when the transistor is saturated and for discharging the capacitor when the transistor is OFF, a relationship of the primary and in-phase relationship of secondaries to saturate and regeneratively saturate a second transistor, and turn-off operation of the second transistor when a positive pulse is applied to the base of the first transistor. One alternate embodiment enables circuit operation at higher currents by utilizing a switchable impedance network for said resistance. Another alternative approach decreases the fall time of the second transistor by the addition of a resistor-diode network connected from base to emitter of the second transistor.

7 Claims, 6 Drawing Figures

SWITCHING TRANSISTOR DRIVE APPARATUS

CROSS REFERENCES TO RELATED INFORMATION AND REFERENCES

The present invention is an improvement over and is distinguished from U.S. Pat. No. 3,683,208, issued to James H. Burens and assigned to the same assignee as is the present invention, and is seen to describe a significantly useful power supply circuit incorporating several features including a control circuit for controlled switching of a pair of output switching power transistors. The control circuit in the patent utilized current pulse generators which were responsive to logic level signals feeding into a multiwinding current transformer. Among its other advantages, the current transformer provided a regenerative feedback path to augment the pase drive current of the output transistors and this produced a power supply circuit in which the fall time of the current in the switching transistors was extremely rapid.

BRIEF SUMMARY OF THE INVENTION

The present invention relates to useful circuit configurations in which the regenerative principle is used to improve both rise and fall times in the switching transistor. This is done by introducing a regenerative component of the output current into the base drive circuit of the switching transistor. Regeneration in the base current reduces the control bias power requirements and also makes the base drive essentially independent of bias supply variations.

FIELD OF THE INVENTION

The present invention is concerned with novel and improved drive circuit configurations conceived for the purpose of improving the efficiency and reliability of transistorized power switching circuits. In the prior art many such circuits have been utilized for power control equipment involving large transfers of energy including power inverters and control circuits for power operated valves. It is desirable in all such circuits that the switching elements be operated as efficiently as possible. In recent years, solid-state components such as transistors have often been used to accomplish this function. It is characteristic of high power transistors that they have relatively slow turn-off and turn-on times. This is a function of the solid-state material used in power transistor construction.

In comparison with relay contact switching in which the voltage drop across the relay contacts changes instantaneously, abrupt voltage changes across solid-state components being switched at high speeds may of necessity be relatively long duration, in some cases in the order of milliseconds. Since the instantaneous power dissipated in switching transistors is the product of the voltage measured across the junctions times the current passing through, it can be seen that relatively long rise or fall times can produce serious power dissipation problems in a system involving switched power transistors.

BACKGROUND OF THE INVENTION

It is an object of this invention to furnish a power supply circuit controlled from logic level inputs.

Another object of this invention is to provide a circuit which is less prone to spurious oscillations and noise-caused faults.

Still another object of the invention is to provide a circuit in which the base current is proportional to the collector current during the saturation phase of the cycle which minimizes storage time.

Another object of the invention is to provide a simple circuit arrangement which permits use of a transformer made of low cost ferrite magnetic materials and which requires low tolerancing on parameters such as leakage inductance.

The present invention covers at least three related configurations of drive networks for transistorized power switching circuits. In each case, a driver transformer is utilized which introduces regeneration by means of an auxiliary secondary winding. The regeneration markedly improves rise and fall characteristics of the power switching transistor, thus improving the overall efficiency of the switching circuit.

BRIEF DESCRIPTION OF THE SEVERAL FIGURES OF THE DRAWINGS

The above and other objects and advantages of this invention will become apparent upon full consideration of the following detailed description accompanying the drawings in which.

DETAILED DESCRIPTION OF THE PREFERRED EMBODIMENTS OF THE INVENTION

Figure 1:
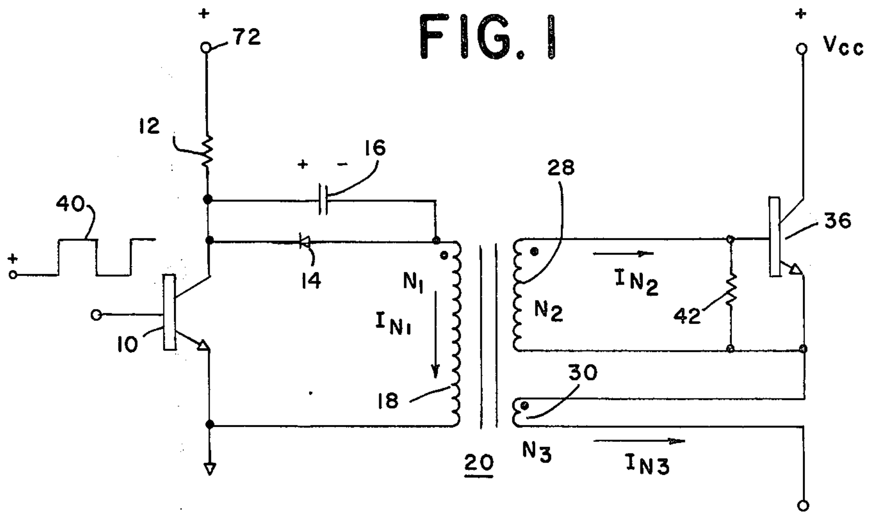
FIG. 1 is a schematic circuit diagram of an embodiment of the invention utilizing a single transistor and a pull-up resistor to control a switching transistor.

Referring not to the embodiment as shown in FIG. 1, there is shown a controlling transistor 10 seen connected to a collector resistor 12. A diode 14 and capacitor 16 couple energy into the primary side 18 of transformer 20. The secondary side of transformer 20 consists of two separate windings 28, 30 each wound in the sense shown. Winding 28 provides base drive for a switching power transistor 36 and winding 30 supplies an additional portion of the base current.

A detailed description of the general operation of this circuit will aid in understanding the principles involved. As shown in FIG. 1, the input signal to the base of transistor 10 is assumed to be a square wave 40 operating around the usual logic levels of zero and plus 5 volts. The analysis which follows assumes this constant dynamic condition.

Transistor 10 determines the static operating state of transistor 36, i.e. when transistor 10 is cut-off then transistor 36 will be saturated and when transistor 10 is saturated then transistor 36 will be cut-off. Turn-on and turn-off conditions of transistor 36 are initiated by the transfer of states of transistor 10. The current transformer 20 is wound so as to reflect current from winding 30 to winding 28 of such polarity as to provide positive base drive for transistor 36. This may be further understood by examining FIG. 1 which shows that current into the dotted end of winding 30 produces a current out of the dotted end of winding 28. The currents are related according to the equation $$I_{N2} = \left(\frac{N1}{N2}\right) I_{N1} + \left(\frac{N3}{N2}\right) I_{N3} \text{ where } \left(\frac{N1}{N2}\right) > 1, \left(\frac{N3}{N2}\right) < 1.$$

To initiate turn-on of transistor 36, a low signal is applied to the base of transistor 10, causing it to operate at cut-off and allowing current to flow through resistor 12, capacitor 16, and primary winding 18. Transformer action increases the current $I_{N1}$ reflected in winding 28 which provides a positive base current of sufficient magnitude to initiate conduction of transistor 36. As transistor 36 begins to conduct, it causes a current in winding 30 which also reflects into winding 28 in an in-phase relationship so that the base current into transistor 36 will increase further until transistor 36 saturates. This regenerative effect results from the relative directions of windings 18, 28 and 30. During the portion of the cycle in which transistor 36 is saturated, the base current is mostly supplied by current reflected by winding 30. Only a small percentage of the base current is due to energy transferred from winding 18. The side of capacitor 16 which is connected to resistor 12 becomes charged to a positive voltage. This stores energy in the capacitor which will be used in the turn-off part of the cycle. If the time constant of resistor 12 and capacitor 16 is greater than the on time of transistor 36, charging of capacitor 16 continues during the time that transistor 36 is saturated.

Turn-off of transistor 36 is initiated by a positive signal applied to the base of transistor 10, causing it to saturate and placing the end of resistor 12 near ground. Capacitor 16 begins discharging through transistor 10 and winding 18 causing a reverse current in winding 28. This causes a negative base-to-emitter voltage on transistor 36. Transistor 36 then enters the storage and fall phase and returns to the cut-off state. After cut-off is reached, capacitor 16 continues to discharge but at a lower rate, providing a reverse base-emitter voltage at transistor 36 for the duration of the cut-off portion of the cycle.

By a proper selection of resistor 12 and N1/N2, a base current for transistor 36 may be reached during turn-on which is sufficient to initiate conduction of transistor 36 even under capacitive loads. Once transistor 36 begins to conduct, winding 30 provides a regenerative current to transformer 20 which adds to the base drive current provided by winding 18 reflected into winding 28. This second source of base current for transistor 36 is reflected by N3/N2. For most power switching transistors the ratio N3/N2 should be set in the order of 0.2 to 0.5 which will result in a forced gain of 5 to 10. Once substantial collector current flows, the majority of the base current for transistor 36 is supplied by winding 30.

Should the collector current of transistor 36 become zero during the saturated period, current will again appear upon the return of positive collector voltage due to the current $I_{N1}$ and its reflected positive base drive $I_{N2}$. This is a marked advantage of this arrangement.

During saturation of transistor 36, the base drive $I_{N2}$ is provided by current from winding 18, $I_{N1}$, and current from winding 30, $I_{N3}$, where $I_{N1}$ reflects a small percentage, possibly ten percent of full load base current. The current in winding 30, $I_{N3}$, reflected through transformer 20 to augment $I_{N2}$ is often referred to as "current feedback." An arrangement which results in the base current for transistor 36 varying proportionately with the collector current is called "regenerative drive" or "proportional drive." The latter two terms pertain to the dominating source of winding 28 current, $I_{N2}$. Regenerative drive can be considered instantaneous since the only delay incurred results from the transformer 20, which is minimal.

Two examples of saturated operation must be considered. The first is concerned with low collector current operation. In this instance, base current, $I_{N2}$, is "proportionally" low and allows minimal base current or losses since the only significant losses are: (1) the power loss in resistor 12 which is small in comparison; and (2) the base-to-emitter loss of transistor 36, $V_{(base\text{-}emitter)} \times I_{N2}$. Current in resistor 42 is much less than the base current for transistor 36, and therefore power loss in resistor 42 is substantially or relatively low.

For high collector current operation, the base current must be designed for the worst case by selecting the N3/N2 such that it is sufficient to maintain saturation and yet minimize storage time of transistor 36 during the turn-off portion of the cycle. During an abnormal overload condition, the collector current may exceed the normal maximum. In this case, the base drive $I_{N2}$ will continue to increase at a rate set by N3/N2 supplying the required current to "ride out" the fault.

The base current power losses for transistor 36 at high collector currents are primarily those of $V_{(base\text{-}emitter)} \times I_{N2}$. The power loss in resistor 12 is a smaller percentage at high collector current than at low collector currents. Since possibly ten percent of the base current is derived from winding 18, a change in control bias results in a small change in base drive power loss, and also does not significantly change the total base current. A 20 percent bias voltage change thus results in approximately a 2 percent total base current change.

In order to turn-off transistor 36, transistor 10 must be provided positive base voltage which causes saturation of transistor 10. Capacitor 16 then begins to discharge around the loop consisting of capacitor 16, transistor 10 and winding 18. The current $I_{N1}$ that capacitor 16 generates is negative in magnitude and thus in accordance with the previously stated equation, $$I_{N2} = I_{N3}\left(\frac{N3}{N2}\right) + I_{N1}\left(\frac{N1}{N2}\right),$$

will subtract from the forward base current. With proper selection of N1, N2, and N3, the net base current will become negative causing transistor 36 to enter "storage."

After the duration of the storage time, the collector current becomes limited by the current gain of transistor 36 and begins to decrease. Reverse base current then becomes likewise limited during the "fall" portion of the cycle and will decrease until transistor 36 reaches "cut-off." At this point, the base-to-emitter current as well as the collector current will become zero. A reverse base-to-emitter voltage for transistor 36 is established during the fall time and is maintained by the reflected voltage applied to winding 18 by the residual charge on capacitor 16. The energy stored in capacitor 16 must be sufficient to handle conditions of minimum conduction time for transistor 36 as well as the conditions for minimum bias voltage range and maximum collector current.

Resistor 12 conducts through transistor 10 from the beginning of turn-off and continues to maintain that current during cut-off of transistor 36. Diode 14 provides a shorting path for capacitor 16 should it become discharged during any overload operating condition and during extremely short conduction periods of transistor 36 where the charging time of capacitor 16 is of too short duration to provide normal turn-off. In this latter condition, turn-off of transistor 36 is strictly that due to the effective short-circuit reflected from winding 18 to winding 28 which causes longer storage and fall times.

In order to maintain the power switching transistor 36 at cut-off, it is desirable to maintain reverse bias on the base-to-emitter junction of transistor 36 for the duration of cut-off to minimize the susceptibility of the device to external influences. This is accomplished by capacitor 16 acting to provide AC balancing of transformer 20.

Applications can require transistor 36 to operate saturated for approximately 50% of a cycle and to remain at cut-off for the remaining 50% while capabilities can be designed to allow operation from low conduction duty cycles to duty cycles in excess of 50%. The frequency of operation is restricted to the limits imposed by the design. Many applications of this circuit are possible because the design parameters may be varied by the designer to accomodate a wide variety of inverters, converters, pulse-width modulated power circuits, power servomechanisms, etc.

With capacitor 16 discharged through transistor 10 and winding 18 during the cut-off portion of the cycle, the reverse bias applied to the base-to-emitter junction of transistor 36 is such that at a maximum duty cycle of 50%, the forward $V_{(base\text{-}emitter)}$ of transistor 36 during saturation is equal to the reverse $V_{(base\text{-}emitter)}$ during cut-off. Under duty cycle conditions where the cut-off time is in excess of 50% of a cycle, the applied reverse voltage decreases proportionally until it approaches zero volts at a maximum of 100% cut-off. The reverse applied $V_{(base\text{-}emitter)}$ minimizes the influence of noise spikes and changes in transistor 36 collector-to-emitter voltage variations. Resistor 42 serves to establish a low reverse current in winding 28, which helps to increase further the noise immunity and to damp oscillations during turn-off or those caused by other external influences during cut-off.

The presence of transformer 20 in the design creates a degree of isolation between the logic level inputs and the drive component of transistor 36. This arrangement has definite advantages in instances where the DC levels which must be established at the switching transistor location and at the control circuit location are markedly different. The isolation also protects the logic level circuits from low frequency surges and ground loop conditions which may exist in and around a high power circuit. Although not shown in FIG. 1, it should be clear that the circuit has advantages when two or more such power switching circuits must be operated in synchronism. Here again, the use of transformer 20 creates a degree of isolation between the power switching circuits while still permitting simultaneous control from one logic level circuit.

Most prior art circuits, in which a transformer drives two power switching transistors, have a single magnetic core transformer and require bifilar windings to close tolerances. The interaction which may result from this arrangement can cause faulty operation and possibly failure of the power switching devices.

In the present invention, transformer 20 may be designed around ferrite magnetic materials which are easy to work with and of relatively low cost. The design of the transformer may also take advantage of the low tolerances required for such parameters as leakage inductance.

The circuit is also useful in instances where the switching transistors must be placed at a remote location and permits the location of the control and regulation components along with other similar circuits and components at another more advantageous place. This is made possible because of the low current required by winding 18 permitting the use of long lines between locations without the accompanying voltage and power losses.

Figure 2:
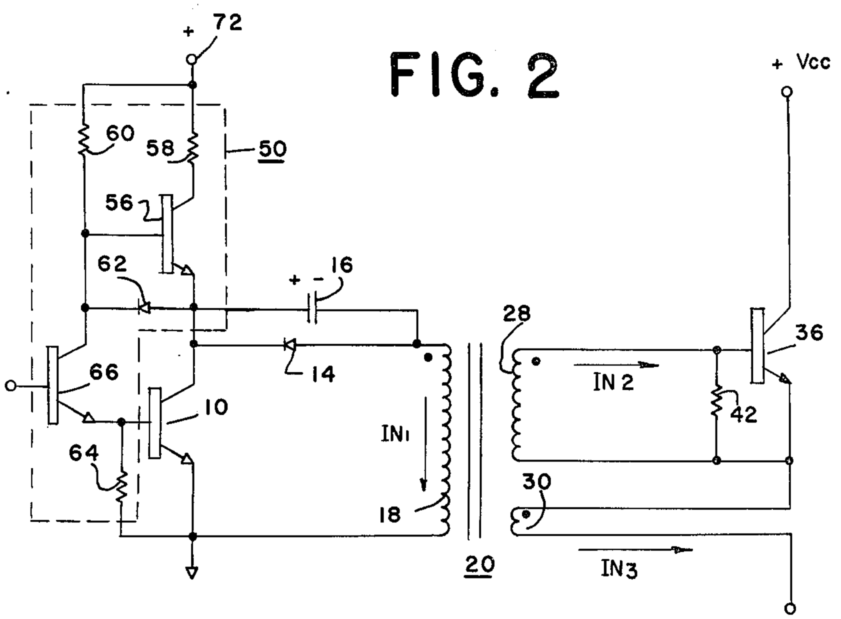
FIG. 2 is a schematic circuit diagram of further embodiment in which a pull-up resistor is replaced by a complementary second transistor.

A second embodiment of the invention is shown at FIG. 2 and differs from the first embodiment in that the circuit is modified to permit operation of the power switching transistor 36 at higher currents. This is accomplished by substituting a combination 50 of a transistor 56, resistor 58, resistor 60, rectifier 62, resistor 64, and transistor 66 for resistor 12 in the first embodiment. Transistor 66 is operated as a switch controlling the states of transistor 10 and transistor 56 which operate in a complementary mode, that is, either transistor 10 or transistor 56 is saturated while the other is cut-off.

During the turn-on portion of the cycle when transistor 36 is to be driven into conduction, the base of transistor 66 is driven low and transistor 66 becomes cut-off. This condition causes transistor 10 to cut-off while transistor 56 becomes saturated and conducts the control source 72 through resistor 58, transistor 56, capacitor 16 and winding 18. Turn-on then proceeds as in the first embodiment except that substantially increased turn-on drive is now available from winding 18. Resistor 58 must be of lower imnpedance than is resistor 12 of FIG. 1.

During saturated operation of transistor 36, the charging of capacitor 16 continues with transistor 56 saturated and transistor 10 at cut-off. Since 58 is of lower impedance than resistor 12 of the first embodiment, the increased $I_{N1}$ current allows capacitor 16 to increase its energy storage in spite of the increased reflected voltage from winding 28 to winding 18 which results from increased base-to-emitter voltage typical of increased collector current conduction.

The turn-off portion of the cycle is initiated by a change of states of transistor 66 causing transistor 10 to become saturated and transistor 56 to go to cut-off. The power loss in resistor 58 is then zero and turn-off proceeds as described in the first embodiment. During the cut-off portion of the cycle, transistor 10 remains saturated and transistor 56 remains at cut-off with no current passing through resistor 58, allowing a relative power savings over the first embodiment.

Diode 62 acts to limit reverse $V_{(base\text{-}emitter)}$ at transistor 56 during turn-off and cut-off of transistor 36.

Figure 3:
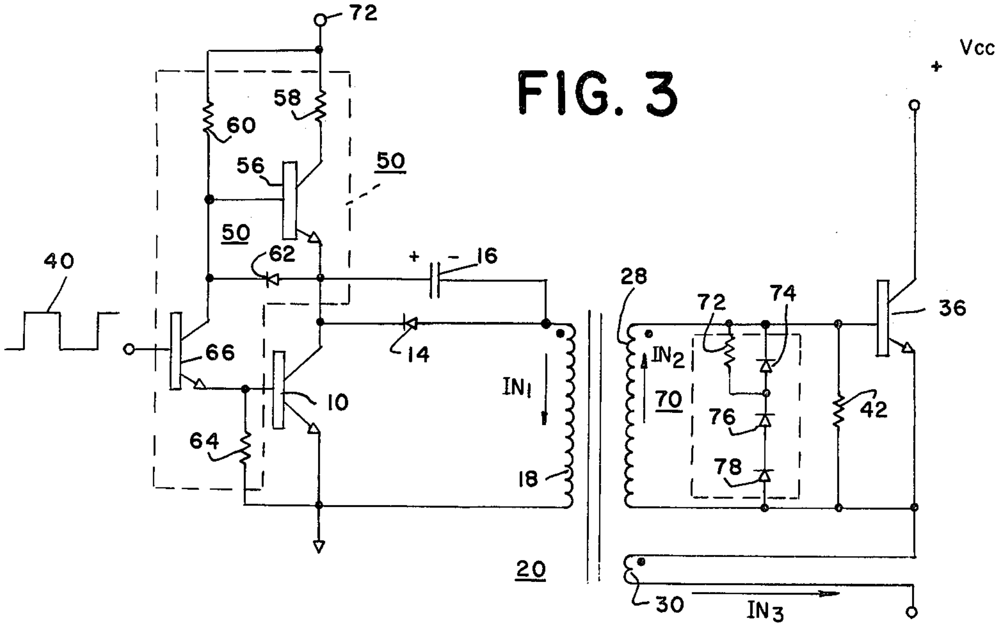
FIG. 3 is a schematic circuit diagram of an embodiment in which there is a further improvement through use of certain passive circuit elements in addition to two transistors to improve the switching characteristics in accordance with a further preferred embodiment of the present invention.

A third embodiment is shown in FIG. 3. In this arrangement, the circuits are essentially identical to that shown in FIG. 2 with the exception of a new additional base circuit 70 at transistor 36 designed for improved turn-off. The additional base circuit 70 is made up of resistor 72 and rectifiers 74, 76, 78. Inclusion of this circuit results in several advantages. First, the reverse $V_{(base\text{-}emitter)}$ of transistor 36 during turn-off is controlled. Oscillations which may occur in the base circuit are damped. The fall time, and consequently the losses due to fall time in transistor 36 are minimized. The action of the embodiment in FIG. 3 is best understood by examination of FIG. 4 which shows current and voltage waveforms associated with transistor 36 during operation of the circuit shown in FIG. 3.

The additional base circuit 70 of the third embodiment has no effect during turn-on, saturation or cut-off of transistor 36. The circuit acts to full advantage during the turn-off portion of the cycle. To achieve full advantage, measures must be taken to increase the winding 28 leakage inductance of transformer 20. This can be accomplished by changing the coil configuration and winding sequence. The correct value of leakage inductance for general switching speeds should be 2 to 3 times the value selected for the embodiment of FIGS. 1 or 2.

Assuming increased leakage inductance at winding 28, turn-off of transistor 36 is initiated as described in the embodiments of FIGS. 1 and 2 as a consequence of a building up of reverse $I_{N1}$ which in turn causes reverse base current to flow. The rate of increase of reverse base current is necessarily longer than in the embodiments of FIGS. 1 and 2 because of the increased leakage inductance of winding 28. This increases the apparent storage time but does not increase losses. As transistor 36 completes storage and enters fall time, three factors are operating on it: (1) reverse $I_{N2}$ becomes limited by the device characteristics; (2) $I_{N2}$, acting as a current source due to increased inductance of winding 28, increases the reverse $V_{(base\text{-}emitter)}$ until some base current becomes shunted into resistor 72 and rectifiers 74, 76, 78; and (3) increasing collector voltage will cause a degenerating effect on the fall time due to the internal capacitive coupling between the collector of transistor 36 and its base. The second factor, utilizing the winding inductance of winding 28, tends to cancel the effect of the capacitive coupling, allowing the fall to be completed in minimum time. As the fall proceeds, the conduction of the base-to-emitter junction becomes less and excess reverse base current becomes shunted into diodes 76, 78 and resistor 72. As this shunt current builds up, the voltage on resistor 72 is clamped by diode 74. At the completion of the fall, transistor 36 enters its cut-off state with its collector-emitter current zero and the base-emitter current zero. The current in winding 28 will then have shifted entirely to the diode string of diodes 74, 76, 78 and the current will decay to zero at a low di/dt rate. This prevents ringing caused by the combinations of the base-to-emitter capacity of transistor 36 and the inductance of winding 28. During this current decay, resistor 72 helps to prevent an abrupt cessation of shunt current when the reverse base-to-emitter voltage drops below the 2.1 to 2.4 volt level as established by the three voltage drops in the diodes 74, 76, 78, and allows conduction down to the 1.4 and 1.6 level. This voltage level is usually low enough to approach that of the reverse $V_{(base\text{-}emitter)}$ during static cut-off conditions and, therefore, will not cause a current reversal in winding 28 nor allow positive base-to-emitter voltage to develop.

Thus, the embodiment of FIG. 3 is improved over those shown in FIGS. 1 and 2 since transistor 36 has a minimum fall time and, therefore, minimum fall time losses, transistor 36 is protected from reverse voltage breakdown, and oscillations which may occur in the base circuit are minimized.

Figure 4A:
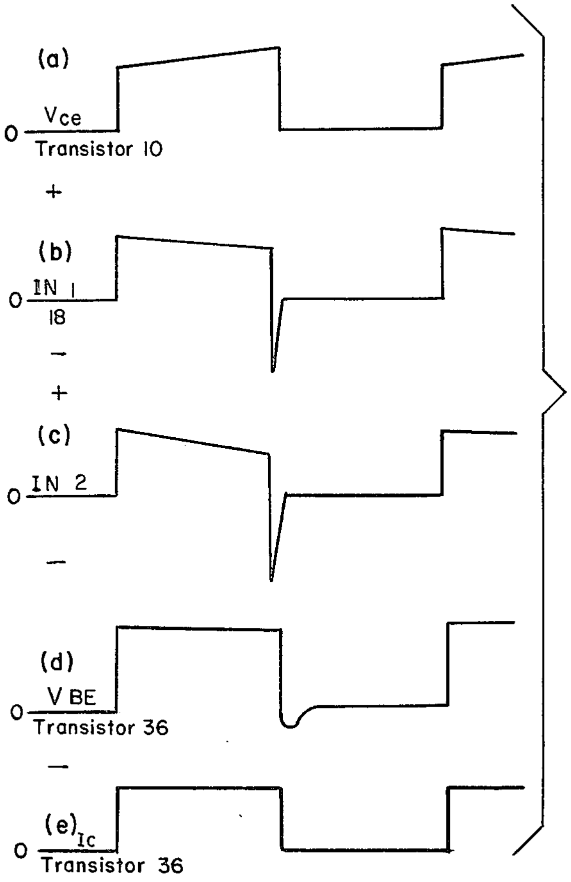
FIG. 4A shows waveforms that relate to the circuit of FIGS. 1 and 2.

FIG. 4A shows waveforms that relate to the circuit of FIGS. 1 and 2. In particular, FIG. 4A (*a*) shows the voltage at the collector of transistor 10; FIG. 4A (*b*) shows the current in the primary N1; FIG. 4A (*c*) shows the current in secondary N2; FIG. 4A (*d*) shows the base-emitter voltage of the transistor 36; and FIG. 4A (*e*) shows the current at the collector of transistor 36.

Figure 4B:
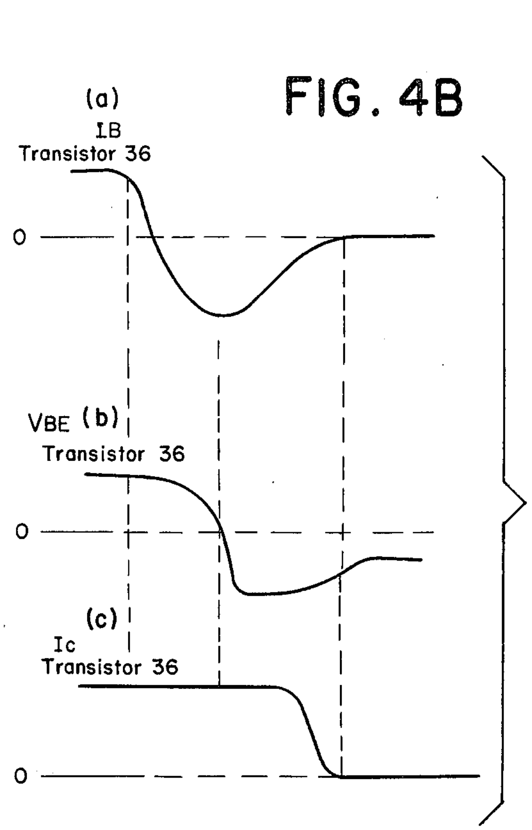
FIG. 4B shows waveforms that relate to the turn-OFF conditions of transistor 36 of FIGS. 1 and 2.
Figure 4C:
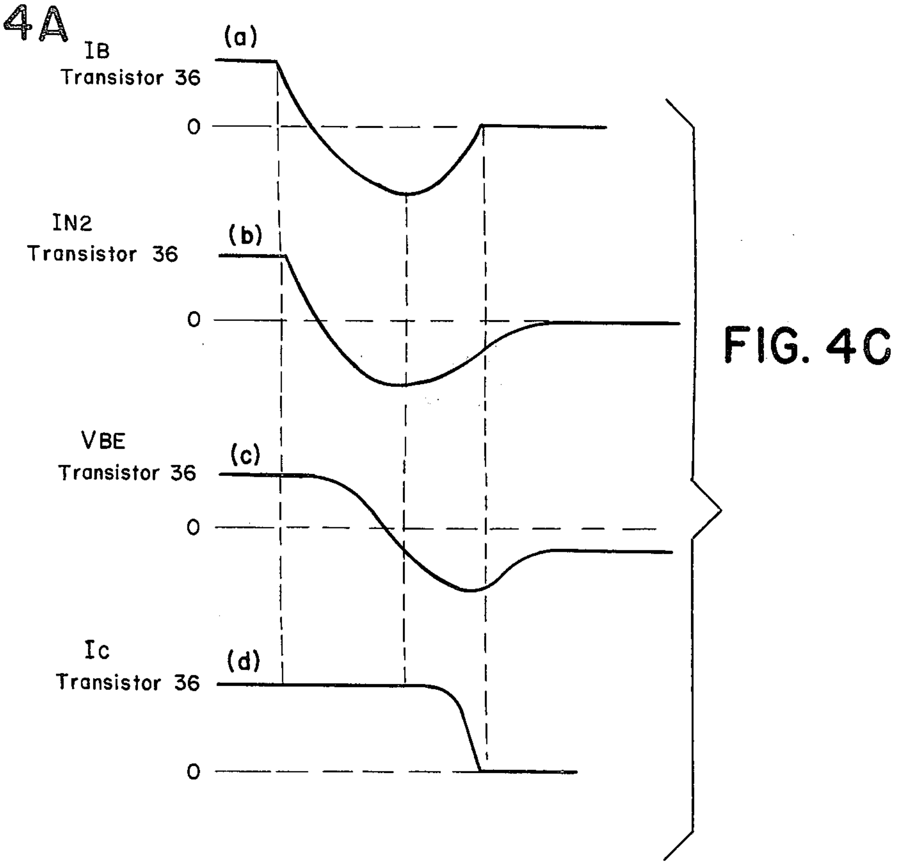
FIG. 4C shows waveforms that relate to the turn-OFF conditions of the circuit of FIG. 3.

In FIGS. 4B and 4C is shown the expansion of the turn-OFF values of (*a*) the embodiment in FIGS. 1 and 2 and of (*b*) the embodiment of FIG. 3, respectively.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. In a switching transistor drive apparatus, a first transistor having a base, a collector and an emitter, a second transistor having a base, a collector and an emitter, a transformer having a primary N1, and secondaries N2 and N3 forming windings of a larger and a smaller number of turns, respectively, for the transformer, first resistance means connecting a source to the collector of the first transistor, an impedance network connecting the collector of the first transistor to a terminal of the primary N1, the other terminal of the primary N1 connected to the emitter of the first transistor and to a return connection of said source, a common terminal for secondaries N1 and N2 connected to the emitter of the second transistor, the secondaries N2 and N3 wound and connected in series aiding relationship so that said secondary of larger number of turns has its other terminal connected to the base of the second transistor and so that the secondary of smaller number of turns has its terminal connected to a load.

2. The invention of claim 1 wherein said impedance network is a parallel arrangement of a capacitor and diode.

3. The invention of claim 1 having means wherein as the second transistor begins to conduct, the current in secondary N3 is reflected into secondary N2, further increasing the base current until saturation of the second transistor occurs, and wherein during saturated operation of the second transistor, the base current thereof is due to that current reflected by N3.

4. The invention of claim 1 wherein said first resistance means is an impedance network including a third transistor coupled between said source and the collector of the first transistor, a further resistor intercoupled between said source and a collector of a fourth transistor, an emitter of the fourth transistor connected to the base of the first transistor, a further resistance coupled between the base and the emitter of the first transistor, a connection between the base of the third transistor and the collector of the fourth transistor, a diode connected between the collector of the fourth transistor and the collector of the first transistor, and a resistor connected between the source and the third transistor.

5. The invention of claim 1 wherein the base circuit of the second transistor has a means active during turn-off consisting of three series diodes arranged in a blocking configuration during conduction of said transistor and a resistor connected in parallel with one of said diodes.

6. The invention of claim 4 wherein the base circuit of the second transistor has a means active during turn-off consisting of three series diodes arranged in a blocking configuration during conduction of said transistor and second resistance means connected in parallel with one of said diodes.

7. In a switching transistor drive apparatus a switching transistor for providing power from a source to a load whenever said switching transistor is forward biased, a multi-winding current transformer having a primary winding, a base winding and a feedback winding, a switching means including a second source from which current flows through a series connection of a resistor, a capacitor and said primary winding for forward biasing said switching transistor, said base winding coupling said switching means to said switching transistor, said feedback winding providing regenerative base current for the forward biased switching transistor, and a turn-off means consisting of a control transistor which when enabled causes a reversal of current flow in the said primary winding and therefore in said base winding of said current transformer.

* * * * *